Patented Mar. 10, 1925.

1,529,435

UNITED STATES PATENT OFFICE.

ANTON JAHL, OF HAMBURG, GERMANY, ASSIGNOR TO J. MICHAEL & CO., OF BERLIN, GERMANY.

PROCESS FOR THE PRODUCTION OF SOLUBLE BARIUM SALTS.

No Drawing. Application filed March 6, 1924. Serial No. 697,410.

*To all whom it may concern:*

Be it known that I, ANTON JAHL, a citizen of the Republic of Czechoslovakia, residing at Hamburg, Germany, have invented certain new and useful Improvements in Processes for the Production of Soluble Barium Salts, of which the following is a specification.

My invention relates to the production of soluble barium salts more particularly from barium sulphide.

Attempts have been made to prepare soluble barium salts especially the chloride and nitrate by direct double decomposition with the corresponding alkali metal salt instead of by using the corresponding acid as at present.

These attempts have been unsuccessful, because the operation results in the precipitation of a sulphur containing salt and not the pure chloride or nitrate, which salt it is very difficult to purify.

A further possibility has been indicated in a process in which a hydrosulphide solution is produced by passing hydrogen sulphide through a barium sulphide solution, and this hydrosulphide solution in the nascent state is decomposed with the corresponding alkali salt. But, it, appears that this reaction does not give any practical result when solutions are used which are not saturated with hydrogen sulphide.

The complete saturation with hydrogen sulphide is, however, scarcely possible, because it is absorbed so slightly at the start. An excess of hydrogen sulphide must therefore be employed and the saturated solution smells strongly of hydrogen sulphide which is very unpleasant; it is practically impossible to carry out all these operations in a closed vessel.

A solution incompletely saturated can be treated like other liquids in an open vessel without inconvenience due to evolution of the gas. On mixing with alkali salts, however, it gives rise to the disadvantage of the first described process.

The present invention is directed towards overcoming these difficulties and rendering possible the production of barium salts by double decomposition with alkali salts. According to my invention a solution of barium sulphide incompletely saturated with hydrogen sulphide is decomposed with an alkali salt, e. g. sodium chloride, by which means there is formed the above mentioned complex sulphur-containing compound of barium. This is treated with a cold or warm saturated solution of the corresponding barium salt, e. g. barium chloride where sodium chloride has been employed. It is thereby converted into the pure crystalline barium salt required. The sulphur compound as well as the sodium chloride goes into solution and this solution is united with the initial barium sulphide and precipitated again with sodium chloride.

Instead of decomposing the complex compound with the barium salt, this barium salt can be added previously and the formation of the complex compound avoided.

*Example I.*

An aqueous solution of barium sulphide is incompletely saturated with hydrogen sulphide. A solution is formed of 85 gms. barium sulphide and 400 gms. barium hydrosulphide in a litre. 300 litres of this solution are heated to boiling, 96 kilograms of common salt are added and stirred to dissolve. On cooling impure crystalline barium chloride separates out. By boiling the mother liquors down to half their volume a complex salt is formed as a precipitate, which consists of barium, sodium, chlorine and sulphur while the solution contains pure sodium hydrosulphide. The impure barium chloride and the complex salt give by washing with saturated barium chloride solution, pure barium chloride; the wash liquors are added to the barium sulphide solution in the next operation.

*Example II.*

An aqueous solution of barium sulphide is incompletely saturated with hydrogen sulphide. A solution is formed containing 160 grams barium sulphide and 232 grams of barium hydro-sulphide in a litre.

To 300 litres of this solution 120 kilograms of crystalline barium chloride and 75 kilograms of common salt are added, the mixture is heated to boiling and after solution of the salt cooled. Pure barium chloride crystallizes out. The mother liquor concentrated to half its volume gives on cooling the complex barium chloride salt as precipitate which is again treated in the barium hydro-sulphide at the next operation.

The mother liquor from the second product contains as before pure sodium hydrosulphide.

I claim:

1. The process of producing a soluble barium salt which comprises treating with an alkali metal salt a solution containing barium sulphide and barium hydrosulphide and modifying the product of such treatment by contact with the corresponding barium salt.

2. The process of producing a soluble barium salt which comprises treating with an alkali metal salt a solution containing barium sulphide and barium hydrosulphide, isolating the product of such treatment and modifying said product by contact with the corresponding barium salt.

3. The step in the conversion of barium sulphides to other soluble barium salts which consists in modifying the product of their reaction with alkali metal salts by contact with the corresponding barium salt.

4. The process of producing a soluble barium salt which comprises treating a solution containing barium sulphide and barium hydrosulphide with an alkali metal salt, isolating the product of such treatment and bringing said product into contact with a saturated solution of the corresponding barium salt.

5. The process of producing a soluble barium salt which comprises bringing a solution containing barium sulphide into contact with hydrogen sulphide to form a solution containing barium sulphide and barium hydrosulphide, treating this solution with an alkali metal salt and modifying the products of such treatment by contact with the corresponding barium salt.

6. The process of producing a soluble barium salt which comprises bringing a solution containing barium sulphide into contact with hydrogen sulphide to form a solution containing barium sulphide and barium hydrosulphide, treating such solution with an alkali metal salt, isolating the product of such treatment and bringing said product into contact with a solution of the corresponding barium salt.

7. The process of producing barium chloride which comprises treating with an alkali metal chloride a solution containing barium sulphide and barium hydrosulphide and modifying the product of such treatment by contact with barium chloride.

8. The process of producing barium chloride which comprises treating a solution containing barium sulphide and barium hydrosulphide with an alkali metal chloride and bringing said product into contact with a solution of barium chloride.

9. The process of producing barium chloride which comprises bringing a solution containing barium sulphide into contact with hydrogen sulphide to form a solution containing barium sulphide and barium hydrosulphide, treating this solution with an alkali metal chloride and modifying the product of such treatment by contact with barium chloride.

10. The process of producing barium chloride which comprises bringing a solution containing barium sulphide into contact with hydrogen sulphide to form a solution containing barium sulphide and barium hydrosulphide, treating such solution with an alkali metal chloride, isolating the product of such treatment and bringing said product into contact with a solution of barium chloride.

11. The process of producing barium chloride which comprises bringing a solution containing barium sulphide into contact with hydrogen sulphide to form a solution containing barium sulphide and barium hydrosulphide, treating this solution with sodium chloride and modifying the product of such treatment by contact with barium chloride.

12. The process of producing barium chloride which comprises bringing a solution containing barium sulphide into contact with hydrogen sulphide to form a solution containing barium sulphide and barium hydrosulphide, treating such solution with sodium chloride, isolating the product of such treatment and bringing said product into contact with a saturated solution of barium chloride.

13. The process of producing barium chloride which comprises treating a solution containing barium sulphide and barium hydrosulphide with sodium chloride and bringing said product into contact with a solution of barium chloride.

14. The step in the conversion of barium sulphides to barium chloride which consists in modifying the product of their reaction with alkali metal chloride by contact with barium chloride.

15. The step in the conversion of a solution of barium sulphide incompletely saturated with hydrogen sulphide into barium chloride which consists in modifying the product of its reaction with alkali metal chlorides by contact with barium chloride.

In testimony whereof I affix my signature to this specification.

ING. CHEM. ANTON JAHL.